United States Patent
Gyoten

(10) Patent No.: US 11,252,384 B2
(45) Date of Patent: Feb. 15, 2022

(54) SEMICONDUCTOR LIGHT SOURCE DRIVING DEVICE AND PROJECTION IMAGE DISPLAY DEVICE

(71) Applicant: Panasonic Intellectual Property Management Co., Ltd., Osaka (JP)

(72) Inventor: Takaaki Gyoten, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/022,573

(22) Filed: Sep. 16, 2020

(65) Prior Publication Data
US 2021/0084265 A1   Mar. 18, 2021

(30) Foreign Application Priority Data
Sep. 17, 2019 (JP) .............................. JP2019-168498

(51) Int. Cl.
*H04N 9/31* (2006.01)
*G03B 21/20* (2006.01)

(52) U.S. Cl.
CPC ....... *H04N 9/3123* (2013.01); *G03B 21/2033* (2013.01)

(58) Field of Classification Search
CPC .... H04N 9/3123; H04N 9/3155; H04N 9/312; H04N 9/3194; G03B 21/2033; G03B 21/2053
USPC ........................................................ 348/744
See application file for complete search history.

(56) References Cited

U.S. PATENT DOCUMENTS

| 10,036,945 | B2* | 7/2018 | Yamada | G03B 21/2053 |
| 2009/0015980 | A1* | 1/2009 | Fukano | H01F 7/1844 |
| | | | | 361/194 |
| 2009/0232175 | A1* | 9/2009 | Sudo | H01S 5/06216 |
| | | | | 372/38.02 |
| 2014/0070728 | A1* | 3/2014 | Pflaum | H05B 45/375 |
| | | | | 315/307 |
| 2014/0077714 | A1* | 3/2014 | Suzuki | G03B 21/208 |
| | | | | 315/200 R |

(Continued)

FOREIGN PATENT DOCUMENTS

| JP | 2007-151292 | 6/2007 |
| JP | 2014-78679 | 5/2014 |
| JP | 2016-225285 | 12/2016 |

*Primary Examiner* — John W Miller
*Assistant Examiner* — Sean N. Haiem
(74) *Attorney, Agent, or Firm* — Wenderoth, Lind & Ponack, L.L.P.

(57) ABSTRACT

A semiconductor light source driving device includes: a switching power supply circuit that converts a voltage across direct current (DC) power supply into a DC output voltage and outputs the DC output voltage to a semiconductor light source; and a light source driving circuit connected in series to the semiconductor light source. The switching power supply circuit includes: a switching circuit; an output capacitor; a controller; and an inductor short circuit. The switching circuit includes: a first switching element for voltage control; a second switching element connected in series to the first switching element; and an inductor connected to a connection point between the first and second switching elements. The inductor short circuit includes a diode and a fourth switching element connected in series to the diode.

3 Claims, 4 Drawing Sheets

(56) References Cited

U.S. PATENT DOCUMENTS

| | | | |
|---|---|---|---|
| 2015/0188431 A1* | 7/2015 | Cho | H02M 3/158 |
| | | | 345/212 |
| 2016/0353533 A1* | 12/2016 | Gyoten | H05B 45/3725 |
| 2018/0180978 A1* | 6/2018 | Yamada | H05B 47/165 |
| 2018/0307131 A1* | 10/2018 | Yamada | G03B 21/2053 |

* cited by examiner

SEMICONDUCTOR LIGHT SOURCE DRIVING DEVICE AND PROJECTION IMAGE DISPLAY DEVICE

BACKGROUND

1. Technical Field

The present disclosure relates to a semiconductor light source driving device that drives a semiconductor light source and to a projection image display device that includes the semiconductor light source driving device.

2. Description of the Related Art

Unexamined Japanese Patent Publication No. 2014-078679 discloses a semiconductor light source driving device according to a conventional example. When this semiconductor light source driving device drives a semiconductor light source, a driving current flowing through the semiconductor light source rises at a high speed.

A semiconductor light source driving device according to a conventional example includes: an inductor, a switching power supply circuit, a first switching element, and an output capacitor. The switching power supply circuit converts input power into output power by intermittently feeding an input current to the inductor to repeatedly storage energy in the inductor and release the energy from the inductor. The first switching element is connected to a load and opens and closes an electric passage to the load. The output capacitor is connected in parallel to both the load and the first switching element.

The semiconductor light source driving device further includes:
(1) a selection switch that is provided between the inductor and the output capacitor and that switches between a first selection state in which the load is connected to the inductor and this inductor is disconnected from the ground potential and a second selection state in which the load is disconnected from the inductor and this inductor is connected to the ground potential;
(2) a timing controller that alternately opens and closes the first switching element and alternately activates and deactivates the switching power supply circuit by intermittently feeding the input current to the inductor, thereby activating the switching power supply circuit during a period in which the first switching element is closed; and
(3) a controller that alternately switches between the first and second selection states of the selection switch.

In the above semiconductor light source driving device, the controller sets the selection switch to the second selection state before the timing controller closes the first switching element. Then, the controller sets appropriately adjusts a period of the second selected state, thereby setting the current flowing through the inductance to a required value before the first switching element is closed. In this way, the rising time of the current can be shortened when the first switching element is closed. Therefore, when the semiconductor light source driving device drives the semiconductor light source, the driving current flowing through this semiconductor light source rises at a high speed.

SUMMARY

The present disclosure provides a semiconductor light source driving device, power efficiency of which is higher than that of the conventional art, the power efficiency being defined as a ratio of input power to output power, in which a current is stable when an output current is changed from an off-state to an on-state, and which can control stability of the current that has been changed from the off-state to the on-state more easily than the conventional art.

A semiconductor light source driving device according to one aspect of the present disclosure includes: a switching power supply circuit that converts a voltage across direct current (DC) power supply into a DC output voltage and outputs the DC output voltage to a semiconductor light source; and a light source driving circuit connected in series to the semiconductor light source. The switching power supply circuit includes: a switching circuit connected in parallel to the DC power supply; an output capacitor; a controller; and an inductor short circuit connected in parallel to the inductor. The switching circuit includes: a first switching element for voltage control; a second switching element connected in series to the first switching element; and an inductor connected to a connection point between the first and second switching elements. The output capacitor is connected to and located between both output ends of the switching circuit. The controller controls the switching power supply circuit. The inductor short circuit includes a diode and a fourth switching element connected in series to the diode. The light source driving circuit includes a third switching element for current control; and a current detection resistor connected in series to the third switching element. The controller detects a current flowing through the semiconductor light source. The controller controls, based on a value of the current, the DC output voltage such that the value of the current equates with a predetermined value. The controller controls, in accordance with a brightness adjustment value received from an outside, a duty ratio of a pulse width modulation (PWM) signal for use in controlling the third switching element, to adjust an average current flowing through the semiconductor light source. The controller sets, in accordance with a turn-off control signal received from the outside, a period in which a value of the duty ratio of the PWM signal is zero. The controller shorts the inductor in the period, by turning off the first and second switching elements and by turning on the fourth switching element.

According to a semiconductor light source driving device of the present disclosure, power efficiency is higher than that of the conventional art, a current is stable when an output current is changed from an off-state to an on-state, and it is possible to control stability of the current that has been changed from the off-state to the on-state more easily than the conventional art.

DETAILED DESCRIPTION

Some exemplary embodiments will be described below in detail with reference to the drawings as appropriate. In some instances, excessively detailed descriptions will be skipped. For example, detailed descriptions of known matters and duplicate descriptions of substantially identical configurations may be skipped. A reason for this is to avoid unnecessary redundancy of the following description and to facilitate understanding of those skilled in the art.

The inventor provides the accompanying drawings and the following description to help those skilled in the art to fully comprehend the present disclosure, but does not intend to limit subject matters recited in the claims with the drawings and the description.

First Exemplary Embodiment

Figure 1:
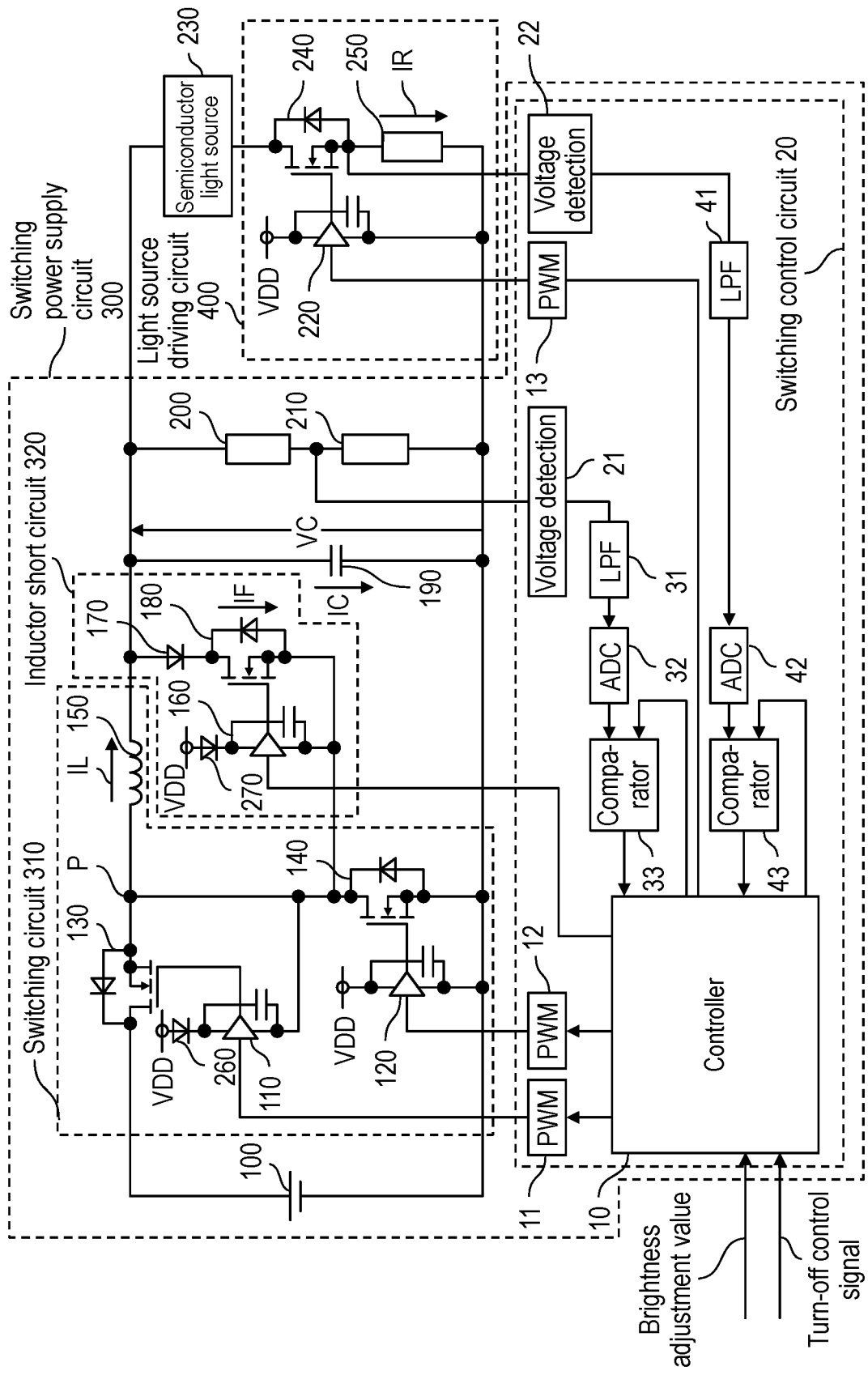
FIG. 1 is a block diagram of a configuration example of a semiconductor light source driving device according to a first exemplary embodiment of the present disclosure.
Figure 2:
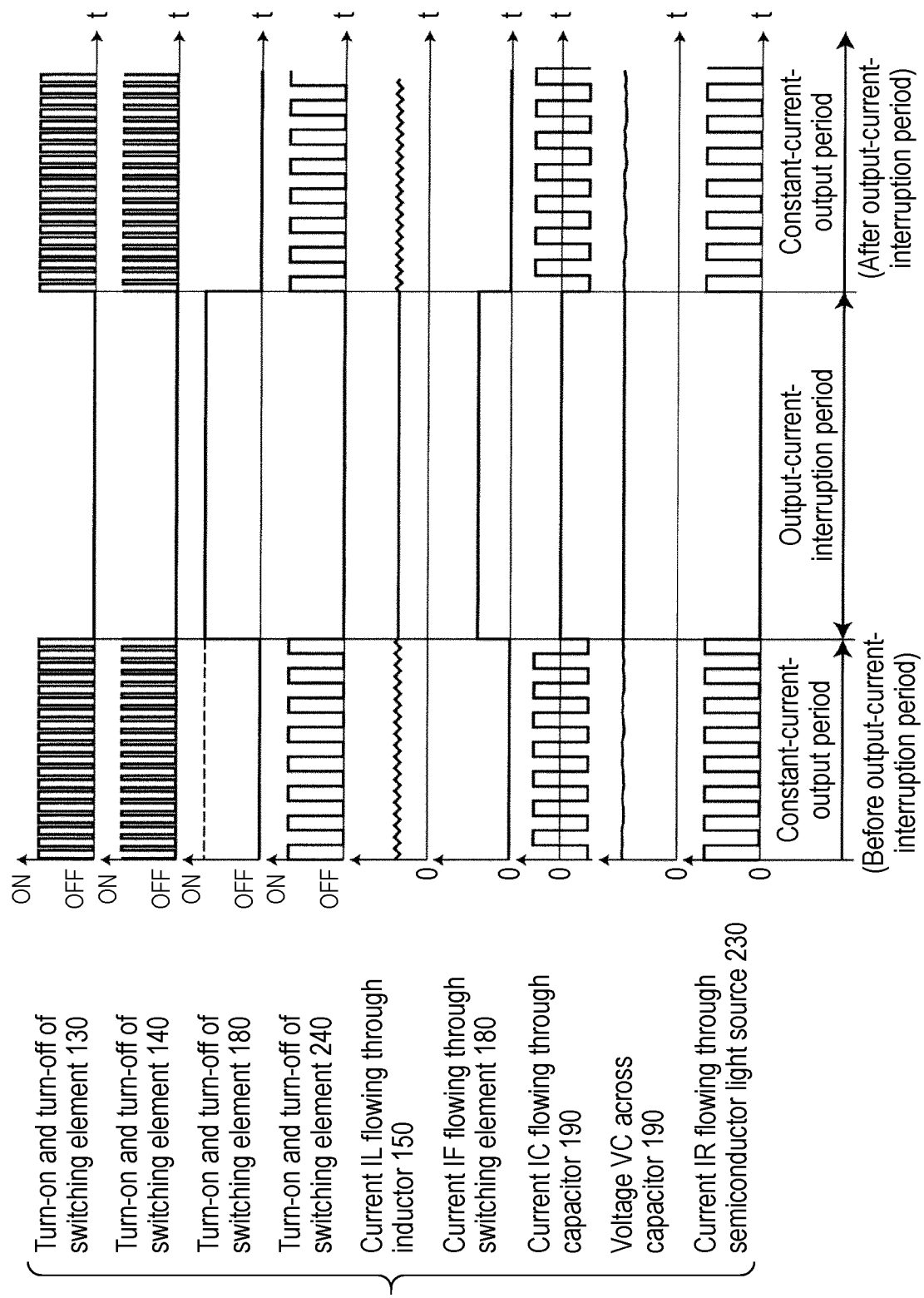
FIG. 2 is a timing chart of an operation example of the semiconductor light source driving device of FIG. 1.
Figure 3:
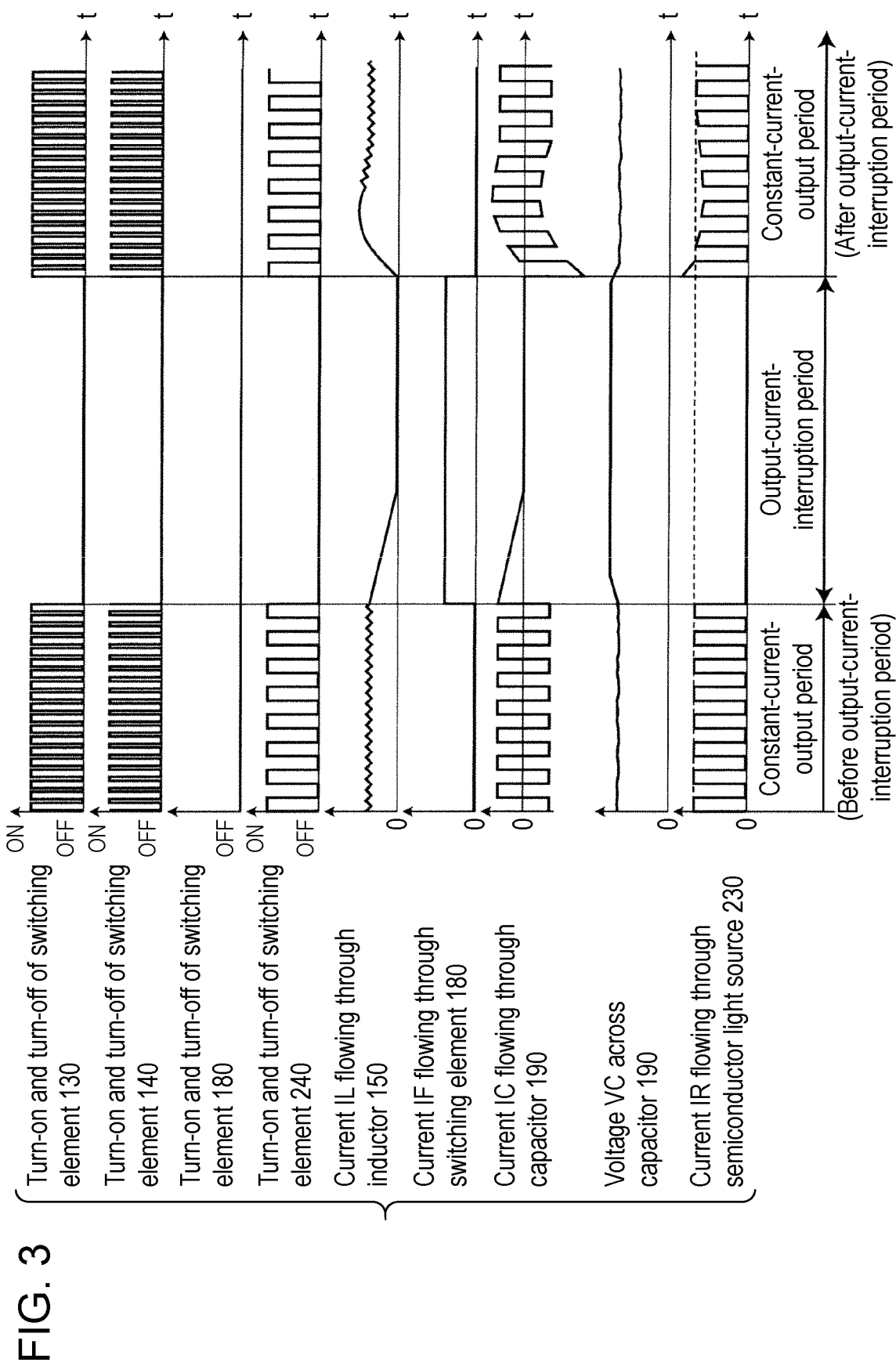
FIG. 3 is a timing chart of an operation example of a semiconductor light source driving device according to a conventional example.

With reference to FIGS. 1 to 3, a first exemplary embodiment of the present disclosure will be described below.

1-1. Configuration

FIG. 1 is a block diagram of a configuration example of a semiconductor light source driving device according to the first exemplary embodiment. In FIG. 1, the semiconductor light source driving device includes switching power supply circuit 300, semiconductor light source 230, and light source driving circuit 400. Switching power supply circuit 300 includes direct current (DC) power supply 100, switching circuit 310, inductor short circuit 320, output capacitor 190, voltage dividing resistors 200, 210 for voltage detection, and switching control circuit 20. Switching power supply circuit 300 converts a voltage across DC power supply 100 into a DC voltage. Switching power supply circuit 300 outputs the converted DC output voltage to semiconductor light source 230. The semiconductor light source driving device according to the first exemplary embodiment is characterized, especially as including inductor short circuit 320 as opposed to a conventional example. It should be noted that switching power supply circuit 300 of the present disclosure does not necessarily have to include DC power supply 100 and may use an external DC power supply instead. In addition, semiconductor light source 230 may be a laser or a light-emitting diode (LED), for example.

Switching circuit 310 includes:
(1) a series connection circuit that is connected in parallel to DC power supply 100 and that includes switching element 130 (first switching element) and switching element 140 (second switching element) for voltage control;
(2) smoothing inductor 150, such as a coil, with its one end connected to connection point P between switching elements 130 and 140;
(3) driving circuit 110 having a driver amplifier that turns on and off switching element 130; and
(4) driving circuit 120 having a driver amplifier that turns on and off switching element 140.

Inductor short circuit 320 includes:
(1) a series connection circuit that is connected in parallel to inductor 150 and that includes diode 170 and switching element 180 (fourth switching element); and
(2) driving circuit 160 having a driver amplifier that controls turn-on and turn-off of switching element 180.

Of diode 170, an anode is connected to the other end of inductor 150 and a cathode is connected to switching element 180.

Output capacitor 190 is connected in parallel to a series connection circuit including inductor short circuit 320 and switching element 140. Output capacitor 190 and inductor 150 constitute a smoothing circuit. A series connection circuit of voltage dividing resistors 200, 210 is connected in parallel to output capacitor 190. Voltage dividing resistors 200, 210 divide voltage VC across output capacitor 190 in accordance with a predetermined voltage dividing ratio and output the divided voltage to voltage detection circuit 21.

A series connection circuit including semiconductor light source 230 and light source driving circuit 400 is connected in parallel to output capacitor 190. Light source driving circuit 400 includes switching element 240 (third switching element), current detection resistor 250, and driving circuit 220. Connected in parallel to output capacitor 190 is a series connection circuit that includes semiconductor light source 230, switching element 240, and current detection resistor 250. Driving circuit 220 includes a driver amplifier that controls turn-on and turn-off of switching element 240. Light source driving circuit 400 is connected in series to semiconductor light source 230.

Switching elements 130, 140, 180 in switching power supply circuit 300 and switching element 240 in light source driving circuit 400 each include an N-channel field-effect transistor (FET), for example. Furthermore, capacitors are connected to power supplies for driving circuits 110, 120, 160, 220 that drive, respectively, switching elements 130, 140, 180, 240. Driving circuits 120, 220 are directly connected to power supply voltage VDD. Power supply voltage VDD is connected to driving circuits 110, 160, respectively, through diodes 260 and 270. The power supply voltage is thereby supplied to driving circuits 110, 160.

Switching control circuit 20 is a control circuit (controller) that controls switching power supply circuit 300. Switching control circuit 20 includes: controller 10; pulse width modulation (PWM) modulation circuits 11, 12, 13; voltage detection circuits 21, 22; low pass filters (LPF) 31, 41; and analog-to-digital (AD) converters (ADCs) 32, 42.

In switching control circuit 20, voltage detection circuit 21 detects the voltage divided by voltage dividing resistors 200, 210. Then, the detected divided voltage is applied to AD converter 32 via low-pass filter 31 for high-frequency suppression, and then is subjected to AD conversion, after which the digital voltage is applied to comparator 33. Comparator 33 calculates an error voltage between the digital voltage value and a voltage output from controller 10 and then outputs the error voltage to controller 10.

Voltage detection circuit 22 detects a voltage across current detection resistor 250 (or a voltage proportional to output current IR flowing through semiconductor light source 230). This voltage is applied to AD converter 42 via low-pass filter 41 for high-frequency suppression and then subjected to AD conversion, after which the digital voltage is applied to comparator 43. Comparator 43 calculates an error voltage between the digital voltage value and a voltage output from controller 10 and then outputs the error voltage to controller 10.

Controller 10, which may be implemented by, for example, a digital computing machine or a computer, controls operations of switching power supply circuit 300 and light source driving circuit 400. In this case, controller 10 generates control signals for PWM modulation circuits 11, 12 in a way that the error voltage from comparator 33 becomes substantially zero. Based on the control signals from controller 10, PWM modulation circuits 11, 12 control duty ratios of PWM signals, thereby turning on and off switching elements 130, 140. Furthermore, controller 10 adjusts voltage data to be output to comparator 33 in a way that the error voltage from comparator 43 becomes substantially zero at the timing when switching element 240 is turned on.

Controller 10 controls a duty ratio of a PWM signal to be output to PWM modulation circuit 13 in accordance with a brightness adjustment value received from the outside, thereby turning on and off switching element 240. Controller 10 controls the turn-on and turn-off of switching elements 130, 140, 180, 240 in accordance with a turn-off control signal received from the outside. The method in which controller 10 controls an interruption of the output current over a long period of time will be described later in detail.

1-2. Operation

FIG. 2 is a timing chart of an operation example of the semiconductor light source driving device of FIG. 1. FIG. 3 is a timing chart of an operation example of a semiconductor light source driving device according to a conventional example which does not include inductor short circuit 320 of FIG. 1. With reference to FIGS. 1 to 3, operations of the semiconductor light source driving devices with the above configurations will be described below.

The driving of switching elements 130, 140 for the voltage control which are connected to DC power supply 100 is controlled by controller 10 in a way that the logical states are mutually inverted as long as switching power supply circuit 300 maintains constant output voltage VC. As a result, when switching element 130 is turned on, a voltage at a positive electrode of DC power supply 100 is generated between connection point P of switching elements 130, 140 for the voltage control and a negative electrode of DC power supply 100. When switching element 130 is turned off, a zero voltage is generated between connection point P and the negative electrode of DC power supply 100. Inductor current IL flowing through inductor 150 increases in proportion to a predetermined value, which can be calculated in the following way. The voltage at connection point P is denoted by A; the voltage across output capacitor 190 is denoted by B; the inductance of inductor 150 is denoted by C; a potential difference between A and B is denoted by D; a value obtained by integrating D over an application time is denoted by E; and a value obtained by dividing E by C corresponds to the above predetermined value. A current proportional to a difference between inductor current IL and the current output from switching power supply circuit 300 charges and discharges output capacitor 190, thereby fixing the voltage across output capacitor 190. In this case, switching control circuit 20 detects the divided voltage obtained by dividing the voltage across output capacitor 190 with voltage dividing resistors 200, 210. Based on a voltage resulting from a comparison between the divided voltage and a target output voltage which is indicated by the error voltage from comparator 33, controller 10 adjusts a duty ratio, which is a ratio of an on-time to off-time of switching elements 130, 140 for the voltage control. Then, controller 10 controls switching power supply circuit 300 so as to output a desired voltage.

A series connection circuit that includes semiconductor light source 230, current control switching element 240, and current detection resistor 250 is connected between output terminals of switching power supply circuit 300. When switching element 240 is turned on, a current flows through semiconductor light source 230 such that the output voltage of switching power supply circuit 300 equates with a sum of the voltages across semiconductor light source 230, switching element 240, and current detection resistor 250. In this case, the total voltage across switching element 240 and current detection resistor 250 is typically much lower than the voltage across semiconductor light source 230. Thus, the current flows through semiconductor light source 230, with the output voltage of switching power supply circuit 300 substantially equating with the voltage across semiconductor light source 230.

Switching control circuit 20 monitors the voltage across current detection resistor 250 at the timing when switching element 240 is turned on. Then, switching control circuit 20 adjusts the output voltage of switching power supply circuit 300 in a way that the current proportional to the monitored voltage has a desired current value. In short, switching control circuit 20 detects the current flowing through semiconductor light source 230 and, based on this detected current value, controls the DC output voltage output from switching power supply circuit 300 in a way that this current value becomes a predetermined value. More specifically, switching control circuit 20 controls switching elements 130, 140 to control the DC output voltage. When switching element 240 for the current control is turned off, no current flows through semiconductor light source 230 connected in series to switching element 240. Controller 10 adjusts a duty ratio for switching element 240, which is a ratio of an on-time to off-time, in accordance with the received brightness adjustment value. In this way, controller 10 adjusts an average value of the current flowing through semiconductor light source 230. In short, controller 10 in switching control circuit 20 controls a duty ratio of a PWM signal for use in controlling switching element 240 in accordance with the brightness adjustment value received from the outside. In this way, controller 10 adjusts the average current flowing through semiconductor light source 230. It should be noted that the average current refers to an average of current IR flowing through semiconductor light source 230 over a period in which a constant current is output, in FIG. 2.

With the above control, controller 10 can supply a current to current semiconductor light source 230 with its peak-to-peak value set to a desired constant value and its average value adjusted by a control value of the duty ratio for switching element 240 for the current control. In short, controller 10 can adjust the average current value for semiconductor light source 230 in accordance with the brightness adjustment signal received from the outside.

Controller 10 has information on a timing at which switching element 240 is to be turned on. Thus, controller 10 selects a timing of the turn-on, namely, a timing at which the current flows through semiconductor light source 230 and then measures the voltage across current detection resistor 250. More specifically, controller 10 in switching control circuit 20 measures the voltage across current detection resistor 250 upon the turn-on of switching element 240. Controller 10 controls the DC output voltage output from switching power supply circuit 300 in a way that the measured voltage becomes a predetermined value. In this way, controller 10 measures the peak-to-peak value of the current flowing through semiconductor light source 230, regardless of duty ratios, which are ratios of the on-time to off-time of switching element 240. Therefore, controller 10 can measure the peak-to-peak value even when the duty ratio becomes relatively low. As a result, controller 10 detects current IR flowing through semiconductor light source 230 only when switching element 240 is turned on, thereby detecting current IR accurately regardless of duty ratios. Therefore, it is possible to accurately measure the peak-to-peak value of the current flowing through semiconductor light source 230. This configuration can use a wider range of duty ratio as compared with the conventional art, thereby widening the range of the average current value flowing through semiconductor light source 230.

If a current supplied to a semiconductor light source is detected through a resistor connected in series to an inductor, as in the method disclosed in Unexamined Japanese Patent Publication No. 2014-078679, the detected current corresponds to an average current value supplied to the semiconductor light source. In this case, it is necessary to control a current supplied to the semiconductor light source by using a detection value that is obtained by multiplying the peak-to-peak value of the current flowing through the semiconductor light source by the duty ratio. Thus, if the duty ratio becomes as low as 10% or less, the control accuracy may be degraded.

With reference to FIGS. 2 and 3, a description will be given below regarding how the semiconductor light source driving device according to the first exemplary embodiment solves the above problem.

In FIGS. 2 and 3, over a period in which a constant current is output (or the period coming before an output-current-interruption period in which no current is output), a current is supplied to semiconductor light source 230 with its peak-to-peak value set to the desired constant value and its average adjusted by the control value of the duty ratio for switching element 240 for the current control. In this state, a time average of the current flowing in or out from output capacitor 190 becomes zero, and the voltage across output capacitor 190 becomes constant.

FIG. 3 illustrates a waveform of a current supplied to semiconductor light source 230 when a long output-current-interruption period is provided for the semiconductor light source driving device according to the conventional example which does not include inductor short circuit 320.

In the output-current-interruption period illustrated in FIG. 3, switching element 240 is kept off over a certain period of time, and thus no current is supplied to semiconductor light source 230. In this period, both of switching elements 130, 140 are kept off, and DC power supply 100 stops supplying its energy to inductor 150. Even in this case, when switching element 180 according to the conventional example, which does not include a switching power supply circuit, is kept off, energy stored in inductor 150 generates electromotive force, turning on switching element 140. As a result, the energy in inductor 150 is transferred to output capacitor 190 until no energy is left, thereby increasing the voltage across output capacitor 190.

After the above output-current-interruption period, a period in which a constant current is output comes. In this period, controller 10 controls the turn-on and turn-off of switching element 130, switching element 140, and switching element 240, thereby attempting to supply semiconductor light source 230 with a current in the same waveform as that supplied over the period in which the constant current is output (which came before the output-current-interruption period). However, the voltage over output capacitor 190 disadvantageously increases. Therefore, at the moment when switching element 240 is turned on, the peak-to-peak value of the current flowing through semiconductor light source 230 may exceed the current flowing over the period in which a constant current is output (which came before the output-current-interruption period). In this case, no energy is stored in inductor 150. Thus, even if the time over which switching element 130 is kept on is set long, the time in which the energy in inductor 150 increases is necessary. During this period, the current flowing out from output capacitor 190 exceeds the current flowing into output capacitor 190. As a result, the voltage across output capacitor 190 is lowered, and accordingly the peak-to-peak value of the current supplied to semiconductor light source 230 decreases with time. After that, the energy stored in inductor 150 increases. Then, when the current flowing out from output capacitor 190 becomes smaller than the current flowing into output capacitor 190, the voltage across output capacitor 190 increases again. When the voltage across output capacitor 190 recovers to the voltage that is the same as that over the period in which a constant current is output (came before the output-current-interruption period), the peak-to-peak value of the current supplied to semiconductor light source 230 also becomes equal.

As described above, if the output-current-interruption period is provided for switching power supply circuit 300 according to the conventional example which does not include inductor short circuit 320 with switching element 180, the peak-to-peak value of the current supplied to semiconductor light source 230 temporarily increases and then decreases. As a result, an overcurrent may flow through semiconductor light source 230, thereby lowering the reliability and varying the emission intensity of semiconductor light source 230 within the period over which the current is not stable. In which case, a system with semiconductor light source 230 may output unstable light. If this system subjects the output light to time-based modulation to express gradation, this graduation may be degraded, for example.

The semiconductor light source driving device of FIG. 1 according to this exemplary embodiment solves the above problem by further including inductor short circuit 320 as opposed to the semiconductor light source driving device according to the conventional example.

As illustrated in FIG. 2, in the output-current-interruption period (or a period over which the duty ratio value of the PWM signal from PWM modulation circuit 13 is zero), switching element 240 is kept off over a certain period, and no current thereby flows through semiconductor light source 230. In addition, both of switching element 130 and switching element 140 are kept off. As a result, DC power supply 100 stops supplying the energy to inductor 150. Then, when controller 10 turns on switching element 180, the energy stored in inductor 150 generates the electromotive force, which further generates counter electromotive force at both ends of inductor 150. This counter electromotive force is short-circuited by both switching element 180 and diode 170 to generate a low voltage such as about 1 V. It should be noted that the counter electromotive force is less likely to turn on switching element 140 because this generated voltage is lower than the voltage across output capacitor 190. Therefore, the energy is stored in inductor 150 without being transferred to output capacitor 190, thereby continuing to feed the current through inductor 150. Furthermore, charging or discharging current for output capacitor 190 becomes zero because no energy is supplied to semiconductor light source 230, and the voltage across output capacitor 190 is thereby maintained. In this case, switching control circuit 20 reserves a period in which the value of the duty ratio of the PWM signal becomes zero, in accordance with the turn-off control signal received from the outside. Actually, during this period, switching control circuit 20 turns off switching elements 130, 140, 240 and turns on switching element 180. In this way, switching control circuit 20 short-circuits inductor 150. More specifically, switching control circuit 20 short-circuits both ends of the inductor 150 at connection point P. By short-circuiting both ends of inductor 150 at connection point P, current IL flowing through inductor 150 is kept constant over the output-current-interruption period, as illustrated in FIG. 2.

After the output-current-interruption period, a period in which a constant current is output comes. Controller 10 controls the turn-on and turn-off of switching element 130, switching element 140, and switching element 240. When controller 10 attempts to supply semiconductor light source 230 with a current in the same waveform as that flowing over the period in which a constant current is output (which came before the output-current-interruption period), the voltage across output capacitor 190 is kept at the same value as that over the period in which a constant current is output (which came before the output-current-interruption period). Therefore, after the moment when switching element 240 is turned on, the peak-to-peak value of the current flowing through semiconductor light source 230 becomes the same value as that over the period in which a constant current is output (which came before the output-current-interruption period). Furthermore, the energy stored in inductor 150 is maintained, and the current flowing through inductor 150 is kept at the same value as that over the period in which a constant current is output (which came before the output-current-interruption period). Therefore, after the moment when the period in which constant current is output (come after the output-current-interruption period) starts, the current is kept at the same value as that over the period in which a constant current is output (came before the output current off period), and the time average of the current flowing in and out from output capacitor 190 becomes zero.

As described above, controller 10 can maintain a constant current flowing through inductor 150 and a constant voltage across output capacitor 190 before and after the output-current-interruption period (or the period when the duty ratio value of the PWM signal from PWM modulation circuit 13 is zero). When switching element 130 is turned on, the voltage across output capacitor 190 becomes lower than that of DC power supply 100. This configuration can prevent diode 170 from being turned on by itself even when switching element 180 is turned off.

1-3. Effect and Others

In this exemplary embodiment, as described above, controller 10 turns off both switching elements 130 and 140 and turns on switching element 180 over the output-current-interruption period (or the period in which the value of the duty ratio of the PWM signal from PWM modulation circuit 13 is zero). In this way, DC power supply 100 stops supplying the energy to inductor 150, and both ends of inductor 150 are short-circuited to maintain energy. As a result, the voltage across output capacitor 190 and the current flowing through inductor 150 at a moment when a period in which a constant current is output (before the output-current-interruption period) ends are equal to those at a moment when a period in which a constant current is output (after the output-current-interruption period) starts.

Switching power supply circuit 300 operates as if the output-current-interruption period were not present. Therefore, after the moment when a period in which a constant current is output (after the output-current-interruption period) starts, switching power supply circuit 300 can supply semiconductor light source 230 with a current in the same waveform as that when a period in which a constant current is output (before the output-current-interruption period) and the period in which a constant current is output (after the output-current-interruption period) successively come.

With the semiconductor light source driving device according to the first exemplary embodiment, as described above, inductor short circuit 320, which is a series connection circuit including switching element 180 and diode 170, is further connected in parallel to inductor 150. This configuration reduces the risk of loss increasing in a diode disposed between an inductor and a semiconductor light source at a timing of supplying a current to a semiconductor light source, as opposed to Unexamined Japanese Patent Publication No. 2014-078679. Consequently, it is possible to maintain a high ratio between the power supplied to the semiconductor light source and the power supplied from DC power supply 100, namely, high power efficiency of the semiconductor light source driving device.

Controller 10 has information on a timing at which switching element 240 is to be turned on. Thus, controller 10 selects a timing of the turn-on, namely, a timing at which the current flows through semiconductor light source 230 and then measures the voltage across current detection resistor 250. In this way, controller 10 can accurately measure the peak-to-peak value of the current flowing through semiconductor light source 230, regardless of duty ratios, which are the ratios of the on-time to off-time of switching element 240. Therefore, controller 10 can measure the peak-to-peak value even when the duty ratio becomes relatively low. Therefore, it is possible to use a wide range of duty ratio and to adjust a wide range of a drive current flowing through the semiconductor light source.

Second Exemplary Embodiment

Figure 4:
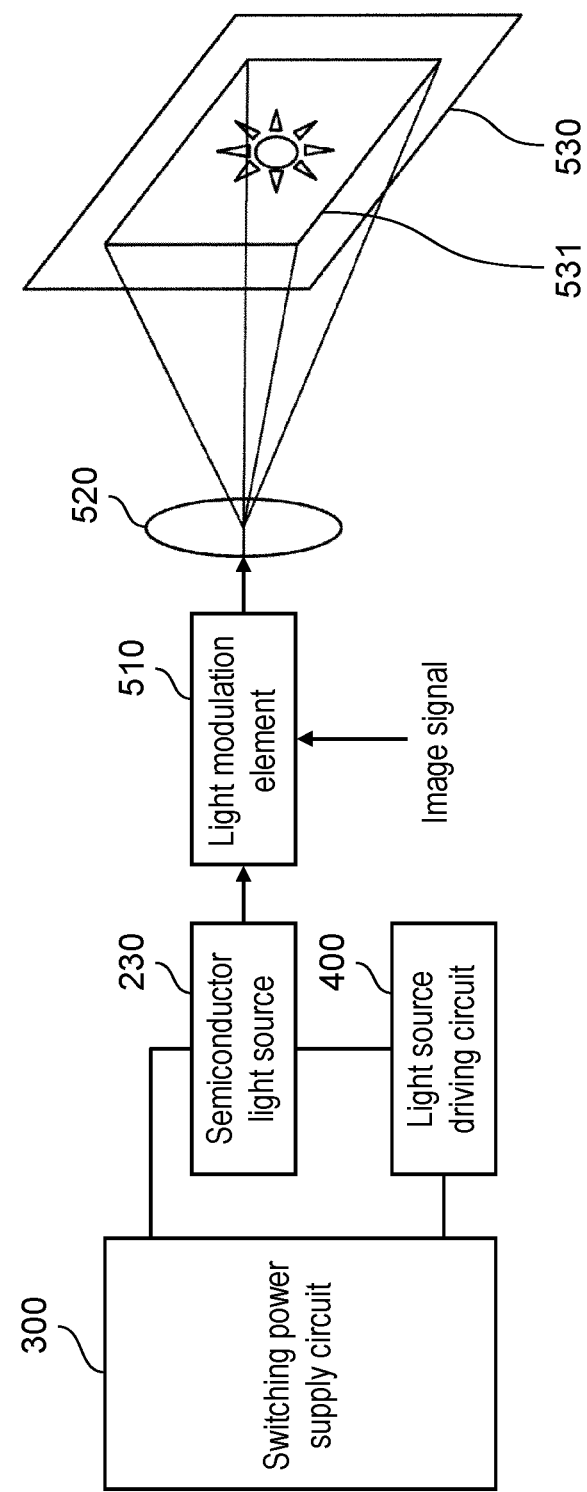
FIG. 4 is a block diagram of a configuration example of a projection image display device according to a second exemplary embodiment of the present disclosure.

FIG. 4 is a block diagram of a configuration example of a projection image display device according to a second exemplary embodiment of the present disclosure.

In FIG. 4, the projection image display device according to the second exemplary embodiment is characterized by including the semiconductor light source driving device illustrated in FIG. 1. In addition to switching power supply circuit 300, semiconductor light source 230, and light source driving circuit 400 that constitute the semiconductor light source driving device, the projection image display device of FIG. 4 further includes light modulation element 510 and projection lens 520.

When semiconductor light source 230 emits laser light, this laser light enters light modulation element 510 and then is optically modulated by light modulation element 510 in accordance with a received image signal. Then, the optically modulated laser light passes through projection lens 520 and is projected onto screen 530. In this way, image 531 of the optically modulated laser light is displayed on screen 530.

The projection image display device with the above configuration includes the semiconductor light source driving device of FIG. 1, thereby providing a function and an effect that are the same as those in the first exemplary embodiment. In this case, power efficiency, which is a ratio of output power to input power, is high, and the current is stable after an output current is turned on. Consequently, it is possible to facilitate control for stabilizing the current after the turn-on and to adjust a wide range of a drive current flowing through the semiconductor light source.

Other Exemplary Embodiments

The first and second exemplary embodiments have been described above as examples of the technique disclosed in the present application. The technique of the present disclosure, however, is not limited to those in the foregoing first and second exemplary embodiments and is also applicable to other exemplary embodiments that undergo some modifications, replacements, additions, and omissions, for example, as appropriate. Another novel exemplary embodiment can also be made by combining some components described in the foregoing exemplary embodiments.

Some other exemplary embodiments will be described below as examples.

In the foregoing first exemplary embodiment, an N-channel FET is used as an example of each of switching elements 130, 140, 180, 240. However, the present disclosure is not limited to this configuration. Actually, each of the switching elements 130, 140, 180, 240 may be any element that can control the turn-on and turn-off of a current. For example, if an NPN transistor may be used as each of switching elements 130, 140, 180, 240, it may be possible to reduce the voltage drop upon turn-on.

In the foregoing first exemplary embodiment, switching control circuit 20 includes controller 10 and other circuits 11 to 43. However, the present disclosure is not limited to this configuration. Alternatively, other circuits 11 to 43 may be implemented by an internal function of controller 10.

As described above, the exemplary embodiments have been described as examples of the technique in the present disclosure. For that purpose, the accompanying drawings and the detailed description have been provided.

To illustrate the above technique, the components described in the accompanying drawings and the detailed description can include not only components necessary to solve the problem but also components unnecessary to solve the problem. For this reason, it should not be promptly recognized that those unnecessary components are necessary just because those unnecessary components are described in the accompanying drawings and the detailed description.

The above exemplary embodiments are provided to exemplify the technique according to the present disclosure. Therefore, it is possible to make various changes, replacements, additions, omissions, for example, within the scope of the claims and equivalents thereof.

The present disclosure is applicable to semiconductor light source driving devices for which an output-current-interruption period is provided. More specifically, the present disclosure is applicable to, for example, projection image display devices, such as projectors including semiconductor light sources.

What is claimed is:

1. A semiconductor light source driving device comprising:
    a switching power supply circuit that converts a voltage across direct current (DC) power supply into a DC output voltage and outputs the DC output voltage to a semiconductor light source; and
    a light source driving circuit connected in series to the semiconductor light source,
wherein
the switching power supply circuit includes:
    a switching circuit that includes (i) a first switching element for voltage control, (ii) a second switching element connected in series to the first switching element, and (iii) an inductor connected to a connection point between the first and second switching elements, the switching circuit being connected in parallel to the DC power supply;
    an output capacitor connected to and located between both output ends of the switching circuit;
    a controller that controls the switching power supply circuit, and
    an inductor short circuit that includes a diode and a fourth switching element connected in series to the diode, the inductor short circuit being connected in parallel to the inductor,
the light source driving circuit includes:
    a third switching element for current control; and
    a current detection resistor connected in series to the third switching element,
the controller detects a current flowing through the semiconductor light source,
the controller controls, based on a value of the current, the DC output voltage such that the value of the current equates with a predetermined value,
the controller controls, in accordance with a brightness adjustment value received from an outside, a duty ratio of a pulse width modulation (PWM) signal for use in controlling the third switching element, to adjust an average current flowing through the semiconductor light source,
the controller sets, in accordance with a turn-off control signal received from the outside, a period in which a value of the duty ratio of the PWM signal is zero, and
the controller shorts the inductor in the period, by turning off the first and second switching elements and by turning on the fourth switching element.

2. The semiconductor light source driving device according to claim 1,
wherein the controller measures a voltage across the current detection resistor when the third switching element is turned on, and
the controller controls the DC output voltage output from the switching power supply circuit such that the measured voltage becomes a predetermined value.

3. A projection image display device comprising:
the semiconductor light source driving device according to claim 1; and
the semiconductor light source.

* * * * *